United States Patent
Whiteman et al.

(10) Patent No.: US 12,517,127 B2
(45) Date of Patent: Jan. 6, 2026

(54) VIRUS NEUTRALIZATION ASSAY UTILIZING IMAGING CYTOMETRY

(71) Applicant: Merck Sharp & Dohme LLC, Rahway, NJ (US)

(72) Inventors: Melissa C. Whiteman, Tomball, TX (US); Joseph M. Antonello, Blue Bell, PA (US); Leah A. Bogardus, Rahway, NJ (US); Danila G. Giacone, Bound Brook, NJ (US); Dengyun Sun, Whippany, NJ (US); Amy H. Hsu, Edison, NJ (US); Kevin B. Gurney, Morristown, NJ (US); Leonard J. Rubinstein, Lansdale, PA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 710 days.

(21) Appl. No.: 17/266,827

(22) PCT Filed: Aug. 9, 2019

(86) PCT No.: PCT/US2019/045822
§ 371 (c)(1),
(2) Date: Feb. 8, 2021

(87) PCT Pub. No.: WO2020/036811
PCT Pub. Date: Feb. 20, 2020

(65) Prior Publication Data
US 2021/0293818 A1 Sep. 23, 2021

Related U.S. Application Data

(60) Provisional application No. 62/718,496, filed on Aug. 14, 2018.

(51) Int. Cl.
*G01N 33/569* (2006.01)
(52) U.S. Cl.
CPC .......... *G01N 33/56983* (2013.01); *G01N 2333/185* (2013.01)
(58) Field of Classification Search
CPC ....... G01N 33/56983; G01N 2333/185; G01N 2469/20
See application file for complete search history.

(56) References Cited

U.S. PATENT DOCUMENTS

2015/0259400 A1 9/2015 Xu et al.

FOREIGN PATENT DOCUMENTS

| KR | 20150007617 A | * | 7/2013 |
| WO | 2012154202 A1 | | 11/2012 |
| WO | 2013144722 A2 | | 10/2013 |

OTHER PUBLICATIONS

De Alwis R, de Silva AM. Measuring antibody neutralization of dengue virus (DENV) using a flow cytometry-based technique. Methods Mol Biol. 2014;1138:27-39. (Year: 2014).*
Whiteman MC, Bogardus L, Giacone DG, Rubinstein LJ, Antonello JM, Sun D, Daijogo S, Gurney KB. Virus Reduction Neutralization Test: A Single-Cell Imaging High-Throughput Virus Neutralization Assay for Dengue. Am J Trop Med Hyg. Dec. 2018; 99(6):1430-1439. (Year: 2018).*
Nascimento EJM, Norwood B, Parker A, Braun R, Kpamegan E, Dean HJ. Development and Characterization of a Multiplex Assay to Quantify Complement-Fixing Antibodies against Dengue Virus. Int J Mol Sci. Nov. 5, 2021;22(21):12004. (Year: 2021).*
Mattia K, Puffer BA, Williams KL, Gonzalez R, Murray M, Sluzas E, Pagano D, Ajith S, Bower M, Berdougo E, Harris E, Doranz BJ. Dengue reporter virus particles for measuring neutralizing antibodies against each of the four dengue serotypes. PLoS One. 2011;6(11):e27252. Epub Nov. 9, 2011. (Year: 2011).*
Stiasny K, Malafa S, Aberle SW, Medits I, Tsouchnikas G, Aberle JH, Holzmann H, Heinz FX. Different Cross-Reactivities of IgM Responses in Dengue, Zika and Tick-Borne Encephalitis Virus Infections. Viruses. Mar. 3, 20211;13(4):596. (Year: 2021).*
Namekar M, Kumar M, O'Connell M, Nerurkar VR. Effect of serum heat-inactivation and dilution on detection of anti-WNV antibodies in mice by West Nile virus E-protein microsphere immunoassay. PLoS One. 2012;7(9):e45851. Epub Sep. 25, 2012. (Year: 2012).*
Fraser JE, Rawlinson SM, Wang C, Jans DA, Wagstaff KM. Investigating dengue virus nonstructural protein 5 (NS5) nuclear import. Methods Mol Biol. 2014; 1138:301-28. (Year: 2014).*
Molecular Devices, LLC. SpectraMax MiniMax 300 Imaging Cytometer for the SpectraMax i3x Multi-Mode Microplate Detection Platform. 2015. (Year: 2015).*
Lundholt BK, Scudder KM, Pagliaro L. A simple technique for reducing edge effect in cell-based assays. J Biomol Screen. Oct. 2003;8(5):566-70. doi: 10.1177/1087057103256465. PMID: 14567784. (Year: 2003).*
Jaquith K. Three ways to reduce microplate edge effect. Mar. 25, 2014. https://www.wellplate.com/three-ways-reduce-microplate-edge-effect/). (Year: 2014).*
Vorndam V, Beltran M. Enzyme-linked immunosorbent assay-format microneutralization test for dengue viruses. Am J Trop Med Hyg. Feb. 2002;66(2):208-12. (Year: 2002).*
Tanner A: Helpful hints to manage edge effect of cultured cells for high throughput screening. 2000. Application note can be found at: http://www.corning.com/lifesciences/technical_information/techdocs/an_hintsedgeeffecthts.pdf. (Year: 2000).*
Gates, Irina et al., Development of a High-Content Orthopoxvirus Infectivity and Neutralization Assays, PLoS One, 2015, 1-20, vol. 10, No. e0138836.
Lin, Yipu et al., Optimization of a Quantitative Micro-neutralization Assay, Journal of Visualized Experiments, 2016, 1-8, 118: e54897.
Shan, Chao et al., Evaluation of a Novel Reporter Virus Neutralization Test for Serological Diagnosis of Zika and Dengue Virus Infection, Journal of Clinical Microbiology, 2017, 3028-3036, vol. 55, No. 10.

(Continued)

*Primary Examiner* — Rachel B Gill
(74) *Attorney, Agent, or Firm* — Jonathan B. Fitzgerald; Emily K. Sauter

(57) ABSTRACT

The instant invention describes a virus reduction neutralization test (VRNT) which is a rapid, high throughput alternative to current standard low throughput and laborious neutralization assays. The VRNT utilizes imaging cytometry to count virus-infected cells at about one day post-infection (thus eliminating the wait time other assays employ allowing for viral infection cell to cell), reducing overall assay time and increasing throughput at least 15-fold.

8 Claims, 8 Drawing Sheets

(56) References Cited

OTHER PUBLICATIONS

Whiteman, Melissa C. et al., Virus Reduction Neutralization Test: A Single-Cell Imaging High-Throughput Virus Neutralization Assay for Dengue, Am. J. Trop. Med. Hyg., 2018, 1430-1439, 99(6).

Durbin, A.P. et al., Attenuation and immunogenicity in humans of a live dengue virus type-4 vaccine candidate with a 30 nucleotide deletion in its 3"-untranslated region, Am. J. Trop. Med. Hyg., 2001, 405-413, 65(5).

Godoi, I.P. et al., CYD-TDV dengue vaccine: systematic review and meta-analysis of efficacy, immunogenicity and safety, Journal of Comparative Effectiveness Research, 2017, 165-180, 6(2).

Green, S. et al., Immunopathological mechanisms in dengue and dengue hemorrhagic fever, Current Opinion in Infectious Diseases, 2006, 429-436, 19.

Hadinegoro, S.R. et al., Efficacy and Long-Term Safety of a Dengue Vaccine in Regions of Endemic Disease, The New England Journal of Medicine, 2015, 1195-1206, 373(13).

Kraus, Annette A. et al., Comparison of Plaque- and Flow Cytometry-Based Methods for Measuring Dengue Virus Neutralization, Journal of Clinical Microbiology, 2007, 3777-3780, vol. 45, No. 11.

L'Azou, M et al., Symptomatic Dengue in Children in 10 Asian and Latin American Countries, The New England Journal of Medicine, 2016, 1155-1166, 374(12).

Lin, Lawrence I-Kuei, A Concordance Correlation Coefficient to Evaluate Reproducibility, Biometrics, 1989, 255-268, 45.

Lin, R. et al., Development of a robust, higher throughput green fluorescent protein (GFP)-based Epstein-Barr Virus (EBV) microneutralization assay, Journal of Virological Methods, 2017, 15-21, 247.

Maistriau, M. et al., A method for the detection of virus infectivity in single cells and real time: Towards an automated fluorescence neutralization test, Virus Research, 2017, 1-6, 237.

Rainwater-Lovett, K. et al., Variation in dengue virus plaque reduction neutralization testing: systematic review and pooled analysis, BMC Infectious Diseases, 2012, 1-15, 12:233.

Roehrig, J.T. et al., Guidelines for Plaque-Reduction Neutralization Testing of Human Antibodies to Dengue Viruses, Viral Immunology, 2008, 123-132, 21(2).

Saez-Llorens, X. et al., Safety and immunogenicity of one versus two doses of Takeda's tetravalent dengue vaccine in children in Asia and Latin America: interim results from a phase 2, randomised, placebo-controlled study, Lancet Infect. Dis., 2017, 615-625, 17.

Salje, H. et al., Variability in Dengue Titer Estimates from Plaque Reduction Neutralization Tests Poses a Challenge to Epidemiological Studies and Vaccine Development, PLOS Neglected Tropical Diseases, 2014, 1-10, 8(6):e2952.

Shan, C. et al., A Rapid Zika Diagnostic Assay to Measure Neutralizing Antibodies in Patients, EBioMedicine, 2017, 157-162, 17.

Song, Ke-Yu et al., A novel reporter system for neutralizing and enhancing antibody assay against dengue virus, BMC Microbiology, 2014, 1-8, 14:44.

Tan, C.Y. et al., Measurement-Methods Comparisons and Linear Statistical Relationship, Technometrics, 1999, 192-201, 41(3).

Timiryasova, T.M. et al., Optimization and Validation of a Plaque Reduction Neutralization Test for the Detection of Neutralizing Antibodies to Four Serotypes of Dengue Virus Used in Support of Dengue Vaccine Development, Am. J. Trop. Med. Hyg., 2013, 962-970, 88(5).

Torresi, J. et al., Vaccines licensed and in clinical trials for the prevention of dengue, Human Vaccines & Immunotherapeutics, 2017, 1059-072, 13(5).

Yang, H. et al., An improved method for estimating antibody titers in microneutralization assay using green fluorescent protein, Journal of Biopharmaceutical Statistics, 2016, 409-420, 26:3.

* cited by examiner

| Concordance Parameter | DEN1 | | DEN2 | | DEN3 | | DEN4 | |
|---|---|---|---|---|---|---|---|---|
| | Estimate | 95% CI | Estimate | 95% CI | Estimate | 95% CI | Estimate | 95% CI |
| Serostatus agreement | 84.8% | (75, 91.9%) | 93.8% | (86.2, 98%) | 90.1% | (81.5, 95.6%) | 90.1% | (81.5, 95.6%) |
| Cohen's Kappa Coefficient | 0.692 | (0.534, 0.851) | 0.876 | (0.772, 0.981) | 0.803 | (0.675, 0.931) | 0.79 | (0.651, 0.924) |
| Pearson Correlation Coefficient | 0.855 | (0.779, 0.931) | 0.931 | (0.9, 0.963) | 0.919 | (0.875, 0.962) | 0.801 | (0.666, 0.936) |
| Lin's Accuracy Coefficient | 0.872 | ND | 0.978 | ND | 0.961 | ND | 0.612 | ND |
| Lin's Concordance Corr. Coefficient | 0.746 | ND | 0.911 | ND | 0.883 | ND | 0.490 | ND |
| Concordance Slope Estimate | 1.09 | (0.86, 1.39) | 0.91 | (0.79, 1.04) | 0.74 | (0.64, 0.85) | 1.22 | (0.89, 1.67) |
| Intercept Estimate | 1.21 | (0.39, 3.7) | 1.24 | (0.62, 2.5) | 4.26 | (1.81, 10.01) | 1.27 | (0.34, 4.72) |
| Fold Difference | 1.82 | (1.43, 2.31) | 0.79 | (0.66, 0.93) | 0.93 | (0.73, 1.17) | 3.07 | (2.33, 4.05) |

FIG.4B

ND – Not Determined

| 1 | 2 | 3 | 4 | 5 | 6 | 7 | 8 | 9 | 10 | 11 | 12 |
|---|---|---|---|---|---|---|---|---|---|---|---|
| 17567 | 19745 | 19415 | 19895 | 21114 | 19823 | 20050 | 20264 | 19917 | 19739 | 20627 | 18182 |
| 20463 | 26044 | 26941 | 27205 | 27945 | 28068 | 27305 | 26880 | 26972 | 28002 | 25901 | 20957 |
| 19386 | 27219 | 29754 | 30858 | 31192 | 31099 | 30472 | 31162 | 31220 | 29956 | 27106 | 21586 |
| 20109 | 27003 | 30307 | 32668 | 32481 | 31973 | 32403 | 32493 | 32493 | 30591 | 28032 | 21458 |
| 19453 | 27119 | 30158 | 31281 | 31255 | 31431 | 31549 | 31831 | 30630 | 30038 | 26876 | 20100 |
| 19802 | 26304 | 29264 | 30552 | 30818 | 30878 | 32079 | 30867 | 30308 | 30216 | 26442 | 19830 |
| 19211 | 25033 | 25922 | 26792 | 26369 | 26309 | 26203 | 26229 | 26232 | 25268 | 24347 | 19626 |
| 16685 | 18540 | 19129 | 18856 | 19619 | 19176 | 19104 | 18919 | 18566 | 19272 | 19022 | 18034 |

| 1 | 2 | 3 | 4 | 5 | 6 | 7 | 8 | 9 | 10 | 11 | 12 |
|---|---|---|---|---|---|---|---|---|---|---|---|
| 33455 | 34060 | 34073 | 33546 | 33928 | 33477 | 33436 | 33654 | 33389 | 33519 | 33207 | 33511 |
| 33816 | 34470 | 33416 | 33205 | 33528 | 32774 | 32970 | 33410 | 33214 | 33687 | 33607 | 33426 |
| 34218 | 34804 | 34071 | 34070 | 33125 | 33417 | 33467 | 32465 | 32708 | 33318 | 32638 | 33062 |
| 33681 | 34407 | 32630 | 33145 | 32571 | 33202 | 32545 | 32807 | 32846 | 32914 | 32636 | 33088 |
| 34360 | 33251 | 32647 | 33301 | 33285 | 32299 | 33246 | 32909 | 32765 | 33074 | 32312 | 33027 |
| 35317 | 34449 | 34033 | 33897 | 33815 | 33020 | 33449 | 32796 | 33752 | 32971 | 32197 | 33186 |
| 33224 | 33177 | 33162 | 32885 | 32315 | 32153 | 32439 | 32439 | 32401 | 32170 | 32538 | 33303 |
| 34436 | 34843 | 32247 | 29829 | 31430 | 32293 | 32349 | 32796 | 32328 | 33130 | 32420 | 33537 |

| 1 | 2 | 3 | 4 | 5 | 6 | 7 | 8 | 9 | 10 | 11 | 12 |
|---|---|---|---|---|---|---|---|---|---|---|---|
| 38846 | 39952 | 40914 | 40726 | 40387 | 39935 | 40273 | 39989 | 40249 | 39981 | 40462 | 40240 |
| 39491 | 38993 | 40614 | 40738 | 40755 | 40354 | 40734 | 40964 | 41025 | 40528 | 40822 | 40647 |
| 40781 | 41409 | 41207 | 41755 | 41607 | 41268 | 41301 | 41313 | 41568 | 41208 | 41083 | 41224 |
| 40925 | 40084 | 40340 | 41586 | 42090 | 41635 | 41872 | 41663 | 41237 | 41304 | 41326 | 41964 |
| 40138 | 40844 | 41206 | 41211 | 41260 | 41797 | 41377 | 41448 | 41542 | 41513 | 41156 | 41503 |
| 39907 | 41014 | 42018 | 41623 | 41316 | 41747 | 41373 | 41420 | 42015 | 41716 | 42034 | 42241 |
| 40251 | 40953 | 41292 | 41110 | 41353 | 41137 | 40563 | 41315 | 41681 | 41243 | 41258 | 41630 |
| 39544 | 40012 | 41178 | 41090 | 40791 | 40679 | 41061 | 40920 | 40963 | 40730 | 41352 | 41016 |

| 1 | 2 | 3 | 4 | 5 | 6 | 7 | 8 | 9 | 10 | 11 | 12 |
|---|---|---|---|---|---|---|---|---|---|---|---|
| 37592 | 37787 | 39508 | 39792 | 39409 | 38919 | 39493 | 39093 | 39604 | 39735 | 39827 | 40026 |
| 38439 | 38635 | 39999 | 40234 | 39866 | 39329 | 39906 | 39632 | 40221 | 40431 | 40515 | 40116 |
| 38637 | 38768 | 39303 | 41540 | 41419 | 42190 | 41419 | 40810 | 41190 | 41421 | 41236 | 40604 |
| 38616 | 38707 | 39302 | 40616 | 41199 | 40967 | 41282 | 41060 | 41083 | 40728 | 40234 | 40375 |
| 38950 | 39566 | 41058 | 41216 | 41009 | 41739 | 42289 | 41468 | 41472 | 41550 | 40994 | 41219 |
| 39135 | 38706 | 39559 | 39517 | 41411 | 40885 | 41246 | 40903 | 41441 | 41577 | 40965 | 41174 |
| 38182 | 39638 | 40008 | 40008 | 40239 | 40203 | 40445 | 40053 | 40033 | 40338 | 40495 | 40060 |
| 39609 | 39581 | 40281 | 40278 | 40799 | 41195 | 41158 | 41026 | 41067 | 41272 | 41473 | 41497 |

FIG.5

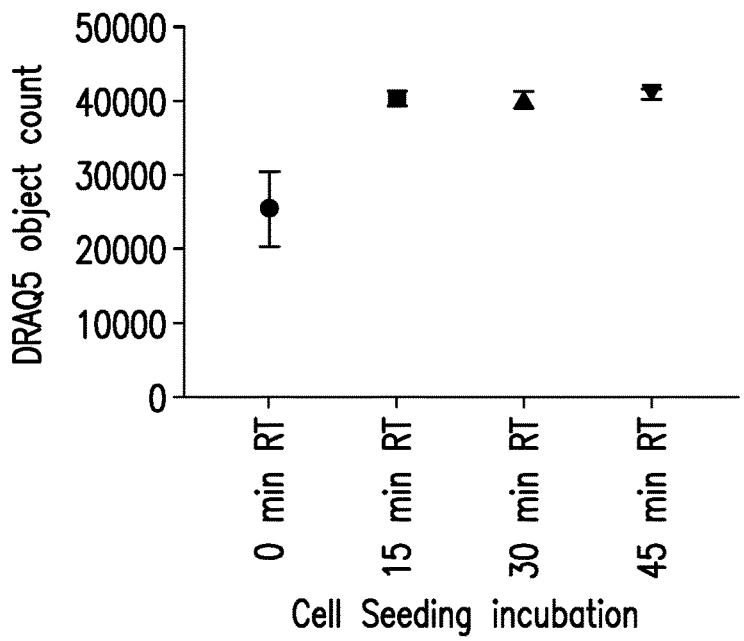
FIG.6A
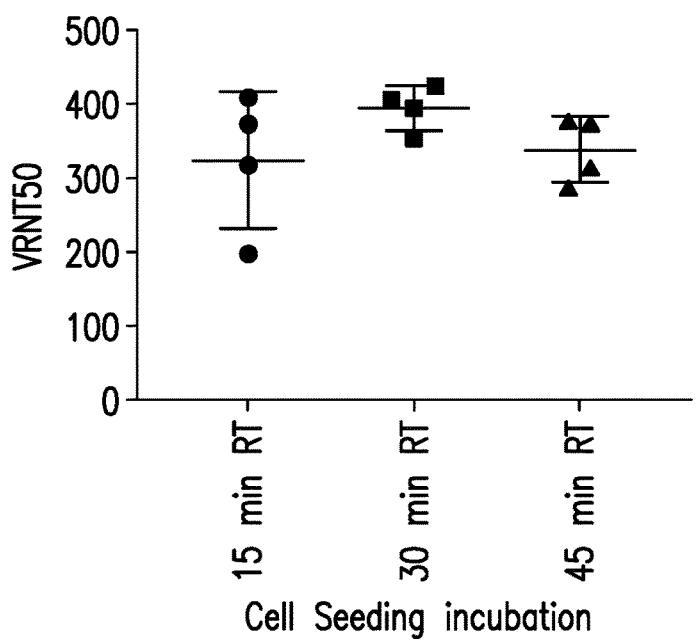
FIG.6B
| | Cell seeding incubation | | |
|---|---|---|---|
| | 15minRT | 30minRT | 45minRT |
| Donor74 | 25% | 7% | 11% |
FIG.6C

VIRUS NEUTRALIZATION ASSAY UTILIZING IMAGING CYTOMETRY

CROSS REFERENCE TO RELATED APPLICATIONS

This application is a U.S. National Phase application under 35 U.S.C. § 371 of PCT Application No. PCT/US2019/045822 filed Aug. 9, 2019, which claims priority from U.S. Ser. No. 62/718,496 filed Aug. 14, 2018.

BACKGROUND OF THE INVENTION

Dengue (DEN) is a mosquito-borne positive-sense RNA virus of the family Flaviviridae (genus *Flavivirus*) with four distinct serotypes (DEN 1-4). Dengue affects over 40% of the world's population and is the leading cause of illness and death in young children in the subtropical and tropical areas of the world (WHO. Dengue Fact Sheet (2007)). Infection with a subsequent dengue virus strain is a risk factor for severe disease and is associated with 90% of dengue hemorrhagic fever (DHF) cases whereas the remaining 10% that present with DHF following primary infection are predominately children within the first year of life (Green, S. and Rothman A., *Curr. Opin. Infect. Dis.* (2006) 19:429-36). Hyperendemic areas circulate all four serotypes. Thus, a vaccine for dengue should be tetravalent, provide a balanced immune response (WHO. Geneva, 2013), and protect young children. One vaccine, Dengvaxia® (CYD-TDV), is currently licensed in several endemic countries for individuals 9-45 years of age, with an age dependent vaccine efficacy of 45-66% (Hadinegoro, S. R. et al., *N. Engl. J. Med.* (2015) 373:1195-1206; Godoi, I. P. et al., *J. Comp. Eff. Res.* (2017) 6:165-180). This vaccine is contraindicated in young children (<9 years) due to lack of efficacy in naïve subjects and supported by increased hospitalizations in vaccinated 2-5 year olds in Phase III trials. The World Health Organization (WHO) set a goal of reducing dengue disease by 25% and death by 50% by 2020 worldwide (WHO Press, Geneva, 2012); therefore, there is a great need for an improved dengue vaccine, particularly one which is efficacious in younger children.

The ability of a vaccine to elicit an immune response is essential to vaccine development and is important in determining clinical efficacy. A measure of the serum antibody response is a preferred method for assessing immunogenicity. Specifically, a functional neutralizing antibody test is a serological assay often performed to detect the amount of antibody that can effectively neutralize the virus, preventing infectivity in vitro. One technique to measure Dengue virus neutralization uses flow cytometry with suspended cells and requires extra steps in the fixing and staining process (de Silva et al., *J. Clin. Microbiology*, (2007) 45:3777-3780). The current gold standard tests to measure virus neutralization, including dengue virus neutralization, are the plaque reduction neutralization test (PRNT), or similar, focus reduction neutralization test (FRNT), which utilizes immunostaining to visualize "plaques," referred to as foci, after infection (plaques are generated when viral infection and further replication spreads from cell to cell). These tests are very time consuming due to slow viral infection rates. For example, some viruses may take days (up to 5 days or more) to show detectable infection via plaque or foci formation. A 24-well plate format has been utilized for dengue clinical sample FRNT testing (Durbin, A. P. et al., *Am. J. Trop. Med. Hyg.* (2001) 65:405-413; Timiryasova, T. M. et al., *Am. J. Trop. Med. Hyg.* (2013) 88:962-970), which can accommodate just one duplicate sample per plate for a 2-fold dilution scheme. Current dengue vaccines in development are tetravalent (Torresi, J. et al., *Hum. Vaccin. Immunother.* (2017) 13:1059-1072), thereby increasing the number of tests per sample 4-fold. For large studies, which include thousands of participants, the quantity of plates required becomes cumbersome and testing plus analysis time is lengthy, therefore, randomized immunogenicity groups encompassing a subset of vaccinated subjects often replaces complete sample testing (Saez-Llorens, X. et al., *Lancet Infect. Dis.* (2017) 17:615-625; L'Azou, M. et al., *N. Engl. J Med.* (2016) 374:1155-1166). Thus, there is a great need to improve the current testing methods to reduce assay time and increase throughput. Described herein is a virus reduction neutralization test (VRNT).

SUMMARY OF THE INVENTION

The instant invention describes a virus reduction neutralization test (VRNT) which is a rapid, high throughput alternative to current standard low throughput and laborious neutralization assays. The VRNT utilizes imaging cytometry to count virus-infected cells at about one day post-infection (thus eliminating the wait time other assays employ allowing for viral infection cell to cell), reducing overall assay time and increasing throughput at least 15-fold.

BRIEF DESCRIPTION OF THE DRAWINGS

FIG. 5. DRAQ5 staining counts and heat map for plates seeded with and without incubation at room temperature (RT) before overnight incubation at 37° C.

FIG. 6. DRAQ5 object count for plates not held or held at room temperature before placing at 37° C. overnight (A) and corresponding $VRNT_{50}$ titers for selected 30 minute time point and gated (15/45 minutes) times (B) and % CV (C).

DETAILED DESCRIPTION OF THE INVENTION

Figure 1:
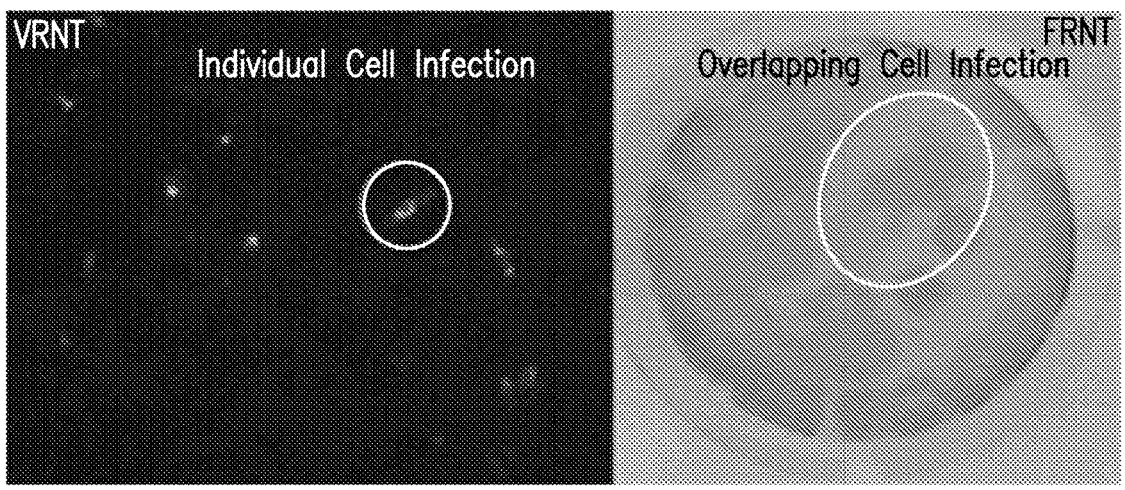
FIG. 1. Side-by-side comparison of VRNT and FRNT methods. In this figure, day one is considered plate seeding rather than assay day 1. Differences include plate format (96-well for VRNT and 24-well for FRNT), infection time and secondary antibody and detection. VRNT detection relies on fluorescent stained cells and cytometer counting; FRNT relies on peroxidase substrate and foci formation for manual foci counting.

The present invention relates to a virus neutralization assay comprising an infection step wherein the infection time lasts no longer than about 24 hours and an imaging step wherein individual cells are counted utilizing imaging cytometry.

In another embodiment, the present invention relates to a virus neutralization assay to determine neutralizing antibody titer in samples comprising an infection step wherein the infection time lasts no longer than about 24 hours and an imaging step wherein individual cells are counted utilizing imaging cytometry.

In another embodiment, the present invention relates to a virus neutralization assay to determine neutralizing antibody titer in samples comprising A) an incubation step; B) a plating step; C) an infection step, wherein the infection time lasts no longer than about 24 hours; D) a fixing step; E) a detection step; and F) an imaging step: wherein individual cells are counted utilizing imaging cytometry.

In another embodiment, the present invention relates to a virus neutralization assay to determine neutralizing antibody titer in samples comprising A) an incubation step: wherein a mixture comprising a virus and a sample containing antibody (sample antibody) is incubated, wherein an amount of the sample antibody binds an amount of the virus rendering the bound virus neutralized; B) a plating step: wherein predetermined amounts of the mixture are added to seeded cells in individual wells of plates wherein unbound virus is free to infect cells; C) an infection step: wherein the infection time lasts no longer than about 24 hours; D) a fixing step; E) a detection step; and F) an imaging step: wherein individual cells are counted utilizing imaging cytometry and software to determine the amount of neutralizing antibody in a sample.

In another embodiment, the virus neutralization assay is a Dengue virus neutralization assay. In another embodiment, the Dengue virus is selected from DEN1, DEN2, DEN3, and DEN4.

In another embodiment, the step A incubation occurs at about 37° C.

In another embodiment, the step A incubation occurs at 37° C.

In another embodiment, the step A incubation occurs at about 37° C. for about 15 to 45 minutes.

In another embodiment, the step A incubation occurs at 37° C. for 15 to 45 minutes.

In another embodiment, the step C infection time is not longer than 18 hours.

In another embodiment, the step C infection time is not longer than 12 hours.

In another embodiment, the step C infection time is not longer than 6 hours.

In another embodiment, the step C infection time is not longer than 3 hours.

In another embodiment, the step C infection time is not longer than 2 hours.

In another embodiment, the step C infection time is not longer than 1 hour.

In another embodiment, the step C infection time is 24 hours.

In another embodiment, the step C infection time occurs between 18 to 24 hours.

In another embodiment, the step C infection time is about 12 hours.

In another embodiment, the step C infection time is 12 hours.

The virus neutralization assay of the instant invention utilizes a number of standard steps and procedures well know in the art and are are generally described below.

Techniques and Steps for Antibody Neutralization Assays:

Incubation:

The incubation step is well known and may also be referred to as a neutralization step. In this step a sample containing antibody (sample antibody) is serially diluted, combined with a fixed amount of virus (creating a mixture) and incubated at various standard times and temperatures. Incubation may occur at room temperature, 37° C., or 4° C. and may run 30 minutes to overnight as needed. In an embodiment of the assay of the present invention, the incubation time is about 30 minutes. In a further embodiment, the incubation temperature is about 37° C.

Plating:

The plating step can be generally described as the addition of the virus and sample antibody mixture, which is created in the incubation step, to plated seeded cells wherein virus not bound to the sample antibody is free to infect the cells. Many different types of seeded cells may be utlized in neutralization assays, including Vero, LLC-MK2, A549, C6/36, Hep-2, and other adherent cell lines. In an embodiment of the assay of the present invention, the seeded cells are adherent cells. In another embodiment, the seeded cells are Vero cells.

Infection:

The infection step can be described as the process of virus entry into cells and replication to produce detectable viral protein. This step occurs over time and can occur rapidly and/or take days. In standard neutralization assays, the infection step requires time, to allow for multiple infection and replication cycles to produce plaques or foci which are then imaged by downstream techniques. In the instant invention, the infection time is not longer than 24 hours. In another embodiment of the instant invention, the infection time is not longer than 18 hours. In another embodiment of the instant invention, infection time is not longer than 12 hours. In another embodiment of the instant invention, the infection time is not longer than 6 hours. In another embodiment of the instant invention, the infection time is not longer than 3 hours. In another embodiment of the instant invention, the infection time is not longer than 2 hours. In another embodiment of the instant invention, the infection time is not longer than 1 hour. In another embodiment of the instant invention, the infection time is 24 hours. In another embodiment of the instant invention, the infection time occurs between 18 to 24 hours. In another embodiment of the instant invention, the infection time is about 12 hours. In another embodiment of the instant invention, the infection time is 12 hours.

Fixing:

There are a number of fixing methods to inactivate virus and permeabilize cells, utilizing a number of known fixatives including alcohol fixatives (methanol, acetone, ethanol, either alone or in combination) and aldehyde fixatives including formalin and paraformaldehyde with separate permeabilization including Triton X-100, as well as other art recognized fixatives. In an embodiment of the assay of the present invention, fixatives used during the fixing step include 1:1 methanol/acetone.

Detection:

There are a number of detection methods that may be used to detect virus in a neutralization assay including utilizing a primary antibody towards the viral protein plus a secondary fluorescent antibody, a primary antibody preconjugated to fluorescent dye, a green fluorescence protein (GFP) tagged virus and others. A preferred method utilizes a primary antibody preconjugated to fluorescent dye.

The virus neutralization assay of the instant invention requires the use of imaging cytometry as defined and described below.

Imaging:

The imaging method of the instant invention utilizes an imaging cytometer (also known as imaging cytometry). In a general sense an imaging cytometer is, comprises, and/or combines use of a microscope (microscopy) and a plate reader (micro-plate reading). There are a number of commercially available imaging cytometers, including: Multimode Microplate Reader—SpectraMax™ (Molecular Devices, San Jose, CA), Cell-Imaging Multi-Mode Reader-CYTATION™ (BioTek, Winooski, VT) and others. A discussion of the use of imaging cyctometry is disclosed in Ozaki Y-i et al. Ozaki Y-i, et al. (2010) A Quantitative Image Cytometry Technique for Time Series or Population Analyses of Signaling Networks. *PLoS ONE* 5(4): e9955. doi: 10.1371/journal.pone.0009955.

In an example of an imaging step and/or process, that may be used as part of the assay of the present invention, plates can be read using a SpectraMax® i3X MiniMax™ 300 imaging Cytometer and corresponding SoftMax® Pro acquisition software version 6.5.1 or version 7.0 utizilng preferred settings. The MiniMax is capable of acquiring 12 sites (a 3×4 grid) per well, which includes the entire well plus areas outside the well. Four of the 12 possible sites per well (approximately 80% of the well) can be acquired to reduce reading time per plate and to eliminate pseudo counts seen from auto fluorescence of the edge of the wells. Acquired object count raw data can be exported as a text file and imported to a MS Excel workbook for processing. The imaging step, utilizing an imaging cytometer and subsequent analysis, is further described in more detail below.

Definitions

The term "adherent cell(s)," also called "anchorage-dependent cells," refers to cells that are grown in cell culture medium while attached to the bottom of a tissue culture flask or other similar container, i.e. plates, multi-well plates, etc.

"Cells" include any cells capable of being plated. Cells that are capable of being plated are adherent cell lines (adherent cells) and may be transformed, immortal or primary cell lines. Cells include Vero, LLC-MK2, Hep-2, C6/36, and A549. In an embodiment of the present invention, Vero cells are preferred.

The term "infection" or "viral infection" refers to the process of a virus entering a cell during the plating step, i.e. viral infection occurs once a virus/sample antibody mixture is added to cells. Virus may enter cells almost immediately, but typically time is allowed for infection to occur. In an embodiment of the present invention, the infection time is not longer than about 24 hours. In another embodiment, the infection time is not longer than 18 hours. In another embodiment, the infection time is not longer than 12 hours. In another embodiment, the infection time is not longer than 6 hours. In another embodiment, the infection time is not longer than 3 hours. In another embodiment, the infection time is not longer than 2 hours. In another embodiment, the infection time is not longer than 1 hour. In another embodiment, the infection time is 24 hours. In another embodiment, the infection time occurs between 18 to 24 hours. In another embodiment, the infection time is about 12 hours. In another embodiment, the infection time is 12 hours.

The term "replication" or "viral replication" means the formation of virus in cells after infection.

The term "sample antibody" means any antibody obtained from serum or plasma or another source (e.g., a sample) that binds to the virus. Antibodies are proteins in the blood that are produced in response to a specific antigen, such as a virus. Neutralizing antibodies are capable of binding to virus and inhibit infection. The sample may contain neutralizing antibodies that bind to the virus in the assay and inhibit infection.

The term "virus" means any single stranded, double stranded, positive sense, negative sense, DNA or RNA virus(es) selected for use in the assay of the instant invention. In an embodiment of the present invention, the virus is selected from the family Flaviviridae (genus *Flavivirus*). In another embodiment, the virus is selected from DEN1, DEN2, DEN3 and DEN4. In another embodiment, the virus is an RSV virus. In another embodiment, the virus is an ebola virus. The amount of virus utilized in the assay varies and is dependent upon assay conditions. The virus input range is 300 to 5,000 object counts. A preferred range is 400 to 3,000 object counts. Object counts refers to virus infected cell counts.

A "virus neutralization assay" is a cell based test performed to detect the level of virus neutralizing antibody in a sample.

The term "neutralizing antibody" means an antibody capable of binding virus and inhibiting infection.

The term "neutralizing antibody titer" means the level of neutralizing antibody in a sample. Titer is determined based upon percent reduction of the virus control and are calculated using a four parameter logistic regression equation as defined in the Materials and Methods section below.

The term "plate(s)" means multiwell plate(s) with a clear bottom. In an embodiment of the present invention, "plate(s)" means multiwell plate(s) that are manufactured with 6, 12, 24, 48, 96, 384 or 1536 sample wells in each plate. In another embodiment, plate(s) are multiwell plate(s) with 24 sample wells or more. In another embodiment, plate(s) are multiwell plate(s) with 48 sample wells or more. In another embodiment, plate(s) are multiwell plate(s) with 384 sample wells or more. In another embodiment, plate(s) are multiwell plate(s) with 1536 sample wells or more. In another embodiment, plate(s) are 96 sample well plate(s). In another embodiment, plate(s) are 384 sample well plate(s). In another embodiment, plate(s) are 1536 sample well plate(s).

The term "seeded" or "seeding" means the addition of cells to a plate with appropriate growth media. In an embodiment of the present invention, the number of cells seeded in a well is or is about 5,000 cells/100 µl. In another embodiment, the number of cells seeded in a well is or is about 10,000 cells/100 µl. In another embodiment, the number of cells seeded in a well is or is about 30,000 cells/100 µl.

The term "unbound virus" means virus that has not been neutralized and is free to infect cells.

The term "viral protein" means any protein encoded by viral nucleic acid and transcribed in a cell during replication.

The invention may be further understood in light of the materials and methods and data provided below.

Materials and Methods

Plate Cell Seeding:

Vero cells (ATCC CCL-81) were counted and measured for viability using a Vi-CELL™ XR (Beckman Coulter) before seeding to 96-well CellBIND® black clear bottom plates (Corning 3340). A total of 30,000 cells were added per 150 µl 10% fetal bovine serum (FBS: Hyclone-SH30071.03HI) containing Minimal Essential Media (MEM: Gibco-11095) supplemented with 1× non-essential amino acids (Gibco 11140), 1× L-glutamine (Gibco-25030) and 1× penicillin/streptomycin (Gibco-15140) per well. Plates were placed in incubator at 37° C. with humidity and +5% $CO_2$ overnight.

Viruses and Determination of Virus Dilution:

The viruses used for these experiments, WHO reference collection strains (Roehrig, J. T. et al., *Viral Immunol.* (2008) 21:123-132) DEN1:West Pacific, DEN2:S16803, DEN3: CH53489, DEN4:TVP-360, were internally sourced. A large bank was generated by passaging the virus in Vero cells, centrifuging, aliquoting supernatant and storing at −80° C. until use. A virus titration was performed in 96-well plates using mock neutralization to determine the working dilution by serially diluting the virus 2-fold horizontally across the plate, combining 1:1 with 2% FBS MEM, incubation at 37° C. for 30 minutes. Next, 50 µl was transferred to the cell seeded plates (media removed prior to transfer) and incubation at room temperature for 30 minutes was followed by incubation at 37° C. overnight. Then cells were fixed and stained as described below. The virus-infected cells were counted by image cytometry (as described below). The development of the VRNT included setting an acceptance criteria of 500-8000 object counts for the virus control, therefore, the dilution of the virus that was within this range was selected as the working dilution for VRNT.

Neutralization and Infection-Assay Day 1:

Two-fold serial dilution of sample (serum) was achieved by adding 20 µl sample (serum) to 180 µl media; the first dilution was added in a 96-well plate (Costar-3879) and diluted 2-fold using a WellPro 3000 (ProGroup Instrument Corp) or manually pipetting (back-up to automation and provides similar results-data not shown). Next, the previously determined working virus dilution was added to the sample (serum) and virus control wells. The serum sample dilutions and virus were mixed by pipetting or plate shaking at 300 RPM for 2 minutes and placed at 37° C. for 30 minutes. The plates were then removed from the incubator and 50 µl was transferred to the cell seeded black 96-well plates (media removed prior to transfer). The serum sample and virus mixture was left to adsorb into the cells for 30-50 minutes at room temperature, followed by the addition of 150 µl of 2% FBS MEM to each well, and the plates placed at 37° C. overnight (22+2 hours).

Fixation and Staining-Assay Day 2:

Approximately 24 hours post-infection (i.e., after the infection step), plates were removed from the 37° C. incubator and left at room temperature for 10 minutes. The inoculum was removed, then cells were washed with a single PBS wash using a plate washer (BioTek) or manually with a pipette before cooling the plates on ice and adding cold acetone. The plates were fixed at −20° C. for 10 minutes, acetone was removed and the cells left at room temperature to dry. At this time, the cells were visually checked for holes in the monolayer. Blocking buffer (1% bovine serum albumin in PBS) was added to the well and cells were blocked for one hour at room temperature. After removing blocking buffer, primary antibody (rabbit anti-envelope dengue antibody developed by Merck) diluted in blocking buffer at predetermined concentrations was added to the wells, and plates were incubated at 37° C. without humidity or $CO_2$ for 30 minutes. Primary antibody was removed and the wells were washed three times with PBS manually or using a plate washer. Alexa Fluor 488 secondary antibody (Invitrogen-A11070) was added at 1:1000 diluted in blocking buffer and plates were incubated at 37° C. without humidity for 30 minutes. The plates were again washed three times with PBS and residual PBS was blotted before adding a final 200 µl of PBS.

Object Counting and Analysis-Assay Day 2:

Plates were read using the SpectraMax® i3X MiniMax™ 300 imaging Cytometer and corresponding SoftMax® Pro acquisition software version 6.5.1 or version 7.0 at a height of 14.2 mm, discrete object analysis with classification and region of interest off. Acquisition settings of wavelength 541, 0 µm focus, at a 45 ms exposure time with discrete object parameter at 5 minimum, 30 maximum and 125 above intensity. The MiniMax is capable of acquiring 12 sites (a 3×4 grid) per well, which includes the entire well plus areas outside the well. Four of the 12 possible sites per well (approximately 80% of the well) were acquired to reduce reading time per plate and to eliminate pseudo counts seen from auto fluorescence of the edge of the wells. Acquired object count raw data was exported as a text file and imported to a MS Excel workbook for processing.

Each test sample dilution series on the plate is fit using a weighted 4-parameter logistic regression function. For each test sample dilution series, the value of the maximum (A) is constrained to be the median count across the 32 virus control wells on the control plate, and the value of the minimum (D) is constrained to be the median response across the 32 cell control wells on the control plate. The values of the slope (B) and $EC_{50}$ (C) are estimated for each duplicate dilution series. The final parameter estimates are the set that minimize the weighted residual sum of squares. The reported titer is the $VRNT_{50}$. This is the estimated dilution of the test sample that provides for a 50% reduction in response where the response range is defined by the minimum and maximum values. The $VRNT_{50}$ is the dilution at which the fitted curve has count (A+D)/2, and is given by C.

The processed samples include the negative quality control (NQC) (dengue negative human serum) and internal quality control (IQC) (dengue positive human serum), in duplicate on the control plate, and each test sample within the particular plate selected for processing. The IQC and NQC were verified for positivity and negativity in both the VRNT and FRNT assays. A separate $VRNT_{50}$ estimate is determined for each of the replicate dilution series. The validity of a run was based on the performance of the control plate, and was assessed according to the following criteria: a) the ratio of the median count of the virus control (VC) to the median count of the cell control (CC) must exceed its lower acceptance limit of 10; b) the maximum count for the CC must be less than the count corresponding to the cutoff; c) the minimum count for the VC must be greater than the count corresponding to the cutoff (50% of the VC mean); d) the 4-parameter logistic regression function must have been successfully fit to each dilution series of the NQC and IQC; e) each of the replicate $VRNT_{50}$ estimates for the NQC must be below its upper acceptance limit, corresponding to the limit of detection or <20; and f) the ratio of the replicate sample $VRNT_{50}$ estimates for the IQC must be below its upper acceptance limit (2-fold). If any of the above criteria are not met, all plates within a run are considered invalid and all test samples within the run must be retested. The validity of each processed sample was assessed according to the following criteria: a) each of the replicate dilution series must have been successfully fit using the 4-parameter logistic function; and b) the ratio of the replicate $VRNT_{50}$ estimates for each dilution series must be below its upper acceptance limit (2-fold). If either of the above criteria is not met, the test sample result is considered invalid and the test sample must be retested in a subsequent run. All cells (with the exception of the specified user-entry cells), worksheets, and modules comprising the processing workbook are locked and password protected to prevent unauthorized and unintended modifications.

VRNT Assay Development and Optimization:

For the DEN2 analysis, eight factors were assessed for their effect on fifteen response variables. The response variables utilized were: a) the object counts for the cell control, b) the values for each of the four-parameters from the curve fitting (i.e., asymptotic maximum, Hill's slope, inflection point, and asymptotic minimum), c) the calculated $VRNT_{50}$ value, and d) the ten estimates of precision (% CV) for each of the dilutions of the serially diluted sample (4G2 neutralizing antibody), for a total of fifteen response variables. Each response variable was analyzed to determine which factors were significant in modeling that response. Only main effects or 2FI that were deemed significant ($p<0.05$) in the ANOVA were included in the model. In addition, the Box-Cox diagnostic function within the software was utilized to determine if a transformation of the raw data was required. As expected, each response variable did not have the same factors or 2FI's that were considered significant. A multiple response optimization approach was taken instead of optimizing each response variable independently. The following constraints were used to find the overall best conditions for the assay: a) the CC was targeted to be in the range of 0-20 object counts, b) the asymptotic maximum (VC) was targeted to be in the range of 300 to 5000 object counts, and c) the Hill's slope had a target of one, and for each of the ten dilution % CV, solutions were determined in order to minimize these values. The results of the simultaneous multiple response optimization is shown in Table 1. Confirmation experiments demonstrated that the levels for the factors chosen from the optimization indeed provided a reproducible assay with the desired outcome.

Figure 2:
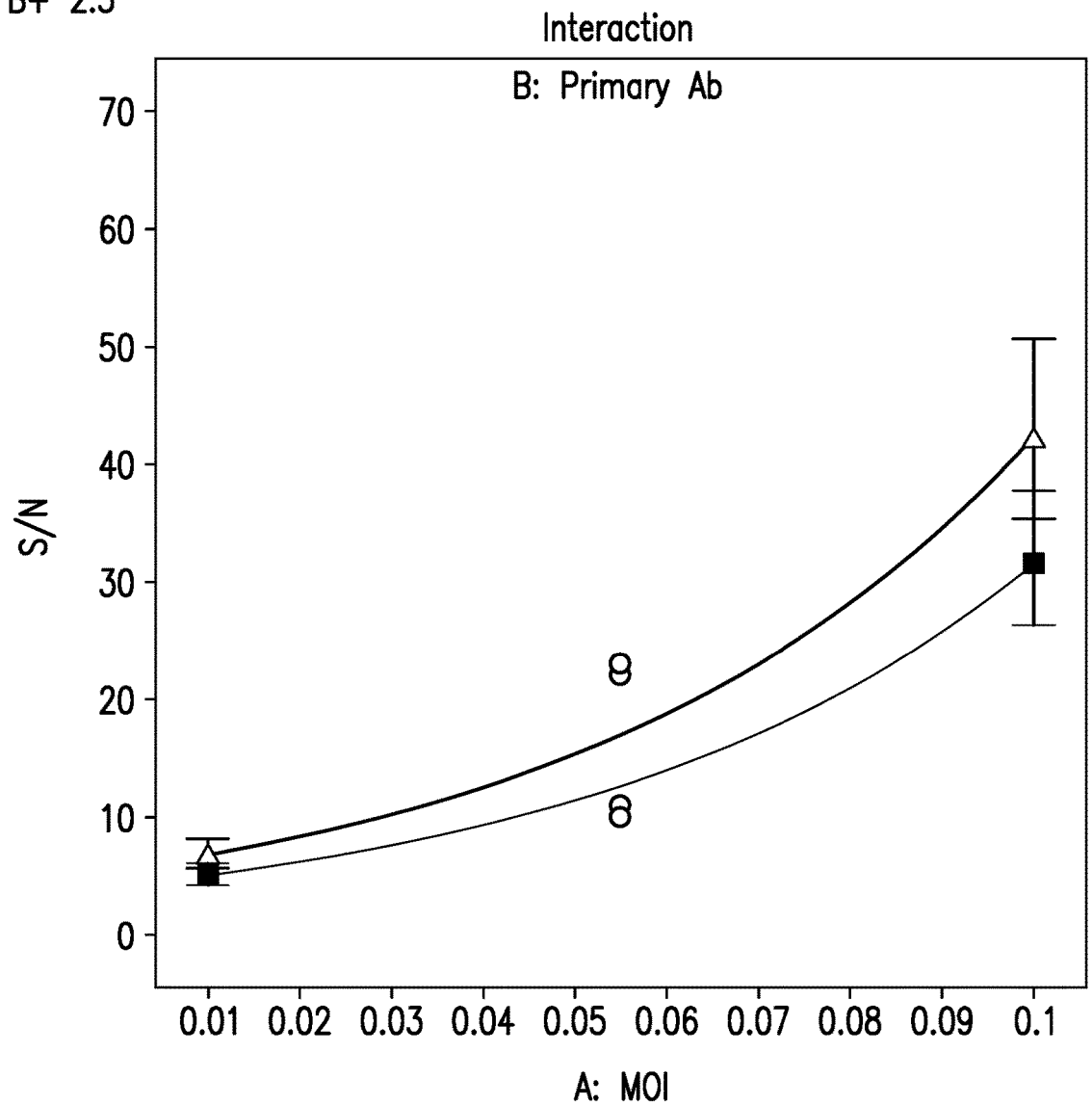
FIG. 2. Interaction plot of MOI and primary antibody concentration on the S/N ratio.

For the DEN1 analysis, three factors were assessed for their effect on two response variables. The response variables utilized were the Hill's slope of the titration curve and the signal-to-noise (S/N) ratio of the VC to the CC. Only main effects or 2FI that were deemed significant ($p<0.05$) in the ANOVA were included in the model. In addition, the Box-Cox diagnostic function within the software was utilized to determine if a transformation of the raw data was required. Results from the analysis indicated that there were no main effects or interactions between factors that were significant for the Hill's slope, thus further analysis only focused on the S/N ratio. Only one factor was significant with a p-value less than 0.05, which was the multiplicity of infection (MOI). However, the p-value for the primary antibody concentration just passed the threshold of 0.05 and was therefore included in the model in the analysis of the S/N ratio. The results demonstrated that an increase in the MOI resulted in an increase in the S/N ratio (FIG. 2).

Since plaques or foci are not determined in the VRNT, MOI (pfu/cells) was replaced with a dilution of virus that was considered optimal and produced object counts greater than 500 for the VC. Subsequent experiments evaluating the primary and secondary antibody incubation time of 60 minutes, demonstrated that this incubation time could be shortened to 30 minutes with no appreciable effect on the performance of the VRNT, noted by no change in the calculated $VRNT_{50}$ titers. The information gathered from the development and optimization of the DEN1 and DEN2 assays was utilized in developing the VRNT for DEN3 and DEN4.

FRNT Titers Over Four Days:

Twenty-four well plates were seeded with 100,000 Vero cells per well and incubated at 37° C. overnight. Neutralization was prepared in 96-well plates with a dengue positive sample. Serial 2-fold dilutions starting at 1:10 were combined 1:1 with 100 PFU virus (50 PFU final). One virus dilution was prepared for all plates. The neutralization plates were placed on the plate shaker for two minutes at 300 RPM to mix before placing at 37° C. for 30 minutes to neutralize. One hundred microliters was added to 24-well cell plates and incubated at room temperature for 30 minutes before placing plates at 37° C. for one to four days. Each day (days 1, 2, 3, and 4) plates were fixed with −20° C. acetone for 15 minutes, then left to dry before blocking for one hour at room temperature. Primary antibody (rabbit anti-dengue custom) was added at 1-2.5 µg/ml (virus dependent) and incubated for 30 minutes at 37° C. The primary antibody was washed three times with PBS before adding 1:500 secondary antibody (KPL-4741516) and incubated at 37° C. for 30 minutes. The secondary antibody was washed three times with PBS before adding TrueBlue (KPL-207802) for five minutes, rinsing and drying plates.

Edge Effect:

Ninety-six well CellBIND® plates were seeded with 30,000 Vero cells per well. One plate was directly placed at 37° C.; another plate was held at room temperature for 15 minutes before placing at 37° C.; another plate was held at room temperature for 30 minutes before placing at 37° C.; and another plate was held at 45 min before placing at 37° C. One dengue positive donor serum was added to each test sample position per plate and serially diluted 2-fold across the plate. One preparation of diluted virus for each serotype was used for all corresponding plates. Neutralization, infection and staining proceeded as described above. DRAQ5 (Fisher-62252) was added with secondary antibody and counted along with virus-infected object counts.

VRNT/FRNT Correlation:

Eighty-one samples from 21 subjects that were previously tested for DEN1-4 in the Q2 Solutions Vaccines FRNT were tested in the VRNT for comparison. The 81 samples were selected based on their DEN1-4 FRNT titers and were divided among baseline and post-vaccination (placebo or active vaccine) time points. Serum was heat-inactivated before aliquoting and storing at −80° C. until use. The VRNT was run as described above.

For the purpose of estimating the titer ratio between assays, titers reported as <10 were excluded from the quantitative titer comparisons. The functional relationship between assay methods was estimated using the linear statistical relationship (LSR) model (Tan, C. et al., *Technometrics* (1999) 41:(192-201)). In comparing measurements between two assays, the LSR model, also referred to as an errors-in-variables model, is a regression model that recognizes that measurement error is present in both assays being compared. In contrast, standard regression models account for the presence of measurement error in just one of the two assays and regard the measures from the other assay as having been obtained exactly, without error. Failure to account for measurement error in both assays results in a biased (i.e. inaccurate) determination of the relationship between assays. Additionally, the correlation between assay measures was estimated by the Pearson correlation coefficient, and Lin's coefficients for accuracy and concordance (Lin. L. I. et al., *Biometrics* (1989) 45:255-268). Qualitative comparisons between assay methods were based on 2×2 cross-classification tables about the reciprocal of the minimum dilution of 1:10. From the 2×2 cross-classification tables, the agreement rate (proportion of double positive and double negative samples relative to the total number of samples) was reported. Cohen's kappa coefficient, the rate of agreement beyond that which could be attributed to chance agreement, was also estimated.

Discussion

VRNT Assay Description:

The virus reduction neutralization test (VRNT) has been developed as an alternative to the PRNT and FRNT. The VRNT is similar to the FRNT in that serum (sample) is serially diluted, then combined with a fixed amount of wild-type virus before adding this mixture onto cells. Like FRNT, fifty-percent neutralizing titers are determined based upon fifty-percent reduction of the virus control and are calculated using the four parameter logistic (4PL) regression model. Unlike FRNT, which counts immunostained foci several days post-infection, the VRNT, reduces the total assay time to two days by imaging individual virus-infected cells one day post-infection using an imaging cytometer (FIG. 1). The VRNT uses a 96-well format that increases samples (in duplicate) per plate up to 6-fold compared to the FRNT. The VRNT offers a number of additional advantages over the PRNT/FRNT such as increasing throughput up to 15-fold, rapid turnaround, reduced sample volume requirements and automation implementation including automated serial dilution, plate washing and the use of the SpectraMax® i3x MiniMax™300 cytometer and SoftMax® Pro microplate data acquisition and analysis software to count virus-infected cells, reducing manual labor.

Design of Experiments:

A design of experiments (DOE) was performed for the VRNT for DEN and DEN2 viruses. DEN2 was chosen as the first virus that was developed in the VRNT. An eight factor DOE was designed to identify the significant factors in order to determine acceptable ranges for subsequent experiments. The factors and the levels investigated in the DOE are shown in Table 1.

Fifteen different response variables were analyzed for this DOE. These included the object counts for the negative control, the values for the parameters for the 4PL regression (asymptotic maximum, slope, $EC_{50}$, and asymptotic minimum), the $VRNT_{50}$ value, and precision estimates for each of the ten points on the serially diluted positive control. For each response variable analyzed there was the potential that different factors would likely be considered to have a significant effect on the particular response. This was indeed the case, so efforts focused on performing a numerical multiresponse optimization. This would allow for a compromise to determine proposed optimal conditions for the confirmation runs without biasing one response variable over the other. The multiresponse optimization was performed with the following constraints: the negative control was set to be the range of 0-20 object counts, the asymptotic maximum was constrained to be within the range of 300-5000 object counts, the slope parameter used a target value of one, the asymptotic minimum was set to be the range of 0-20 object counts, and the precision for each point of the dilution series was to find the minimum value. The results of the simultaneous multiresponse numerical optimization are shown in Table 2.

TABLE 2

Summary of optimal conditions for DEN2 DOE.

| Factor | Conclusion |
| --- | --- |
| A: Neutralization mixture plate incubation temperature | Ambient |
| B: Incubation time and temperature of primary antibody | 60 minutes at 37° C. |
| C: Secondary Antibody incubation time | 70 minutes |
| D: Cell seeding density | $3 \times 10^4$ |
| E: Multiplicity of Infection (MOI) | 0.01 |
| F: Neutralization mixture time and temperature | 30 minutes at 37° C. |
| G: Concentration of primary antibody | 1 µg/mL |
| H: Secondary Antibody dilution | 1:1000 |

TABLE 1

DOE factors and levels investigated for DEN2

| Factor | Whole Plot or Sub-Plot | Level 1 | Level 2 | Level 3 | Level 4 |
| --- | --- | --- | --- | --- | --- |
| A: Plate incubation temperature | Whole Plot | Ambient | 37° C. | N/A | N/A |
| B: Primary Ab incubation time and temperature | Whole Plot | 60 minute/ 37° C. | overnight/ 4° C. | N/A | N/A |
| C: Secondary Ab incubation time | Whole Plot | 30 minute | 90 minute | N/A | N/A |
| D: Cell seeding density | Sub-Plot | $1 \times 10^4$ cells | $3 \times 10^4$ cells | N/A | N/A |
| E: MOI | Sub-Plot | 0.01 | 0.1 | N/A | N/A |
| F: Neutralization mix incubation time and temperature | Sub-Plot | 30 minute/ 30° C. | overnight/ 4° C. | 60 minute/ 37° C. | 60 minute/ ambient |
| G: Primary Ab concentration | Sub-Plot | 1 µg/ml | 10 µg/ml | N/A | N/A |
| H: Secondary Ab dilution | Sub-Plot | 1:250 | 1:1000 | N/A | N/A |

Confirmation experiments demonstrated that the levels for the factors chosen provided a reproducible assay with the desired outcome.

A smaller DOE was performed for DEN1. The factors, levels investigated, and the factor settings held constant are shown in Table 3.

Table 3i. And 3ii. DOE Factors, Levels and Constant Factors Investigated for DEN1

| 3i.DOE Factors | | |
|---|---|---|
| | Level 1 | Level 2 |
| A: MOI | 0.01 | 0.1 |
| B: Primary Ab concentration | 1 µg/ml | 2.5 µg/ml |
| C: Secondary Ab dilution | 1:250 | 1:1000 |

| 3ii.Constant Factors | |
|---|---|
| D: Neutralization mix incubation temperature | Ambient |
| E: Primary Ab incubation time and temperature | 60 minutes/37° C. |
| F: Secondary Ab incubation time | 60 minutes |
| G: Cell seeding density | 30,000 cells/well |
| H: Neutralization time and temperature | 30 minutes/37° C. |

Two response variables were considered for analysis, (1) the slope of the curves, and (2) the signal-to-noise (S/N) ratio of the positive control to the negative control. Results from the analysis indicated that none of the factors were significant in affecting the slope of the curves and focus was placed on the S/N ratio. The Box-Cox diagnostic indicated a natural log transformation of the data was required, and the ANOVA resulted in one factor with a significant p value <0.05, the MOI. However, one factor—the primary antibody concentration, just passed the threshold of significance at the 0.05 level, and was kept in the model. Of the three factors evaluated, only MOI and the primary antibody concentration were included in the analysis model for S/N (FIG. 2).

Both DOE's demonstrated higher MOI lowered the S/N ratio and produced slopes close to 1. Since plaques or foci are not determined in the VRNT, MOI (PFU/cells) was replaced with dilution of the virus that produced object counts >500, as this was determined optimal. Subsequent experiments comparing the primary and secondary antibody incubation time of 60 minutes to a preferred shortened time of 30 minutes showed no change in titer and the preferred time was implemented. Given the information from the two DOE's and follow-up experiments, DEN3 and DEN4 were titrated to determine the working dilution that produced object counts >500 and the primary antibody concentration was optimized before confirmation of suitability including the responses evaluated in the DOE's: slope near 1, asymptotic minimum <20 counts, object counts >500, high S/N ratio. Other factors, including incubation times and temperatures were held constant.

VRNT Versus FRNT:

The VRNT platform demonstrates good precision. Over a ten-month period, a positive control serum sample was tested in the DEN2 assay across 33 runs performed between five analysts and two laboratories (Merck & Co., Inc., Kenilworth, NJ USA and $Q^2$ Solutions Vaccines, San Juan Capistrano, CA USA). The overall coefficient of variation (CV) of the $VRNT_{50}$ titer across the 33 runs was 23%, with all 33 titers falling within 1.5-fold of the median titer. This level of assay precision appears to be an improvement compared to other validated plaque reduction neutralization assays for dengue virus (Roehrig, J. T. et al. *Viral Immunol.* (2008) 21:123-132).

Figure 3A:
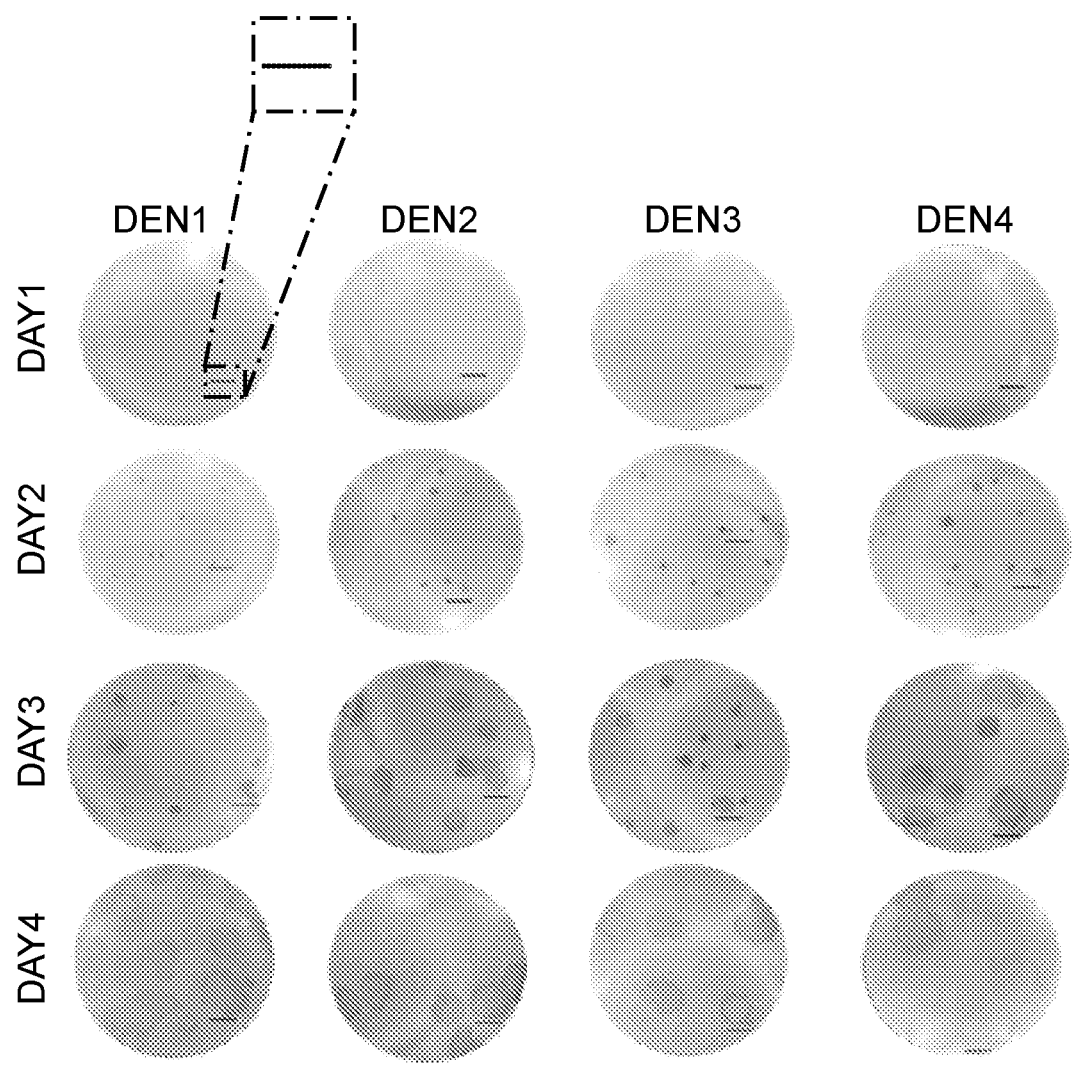
FIG. 3. FRNT over four days with DEN1-4 using a single positive donor serum sample. Foci development over four days reveals smaller foci can be in close proximity. Scale bar represents 2 mm. (A) $FRNT_{50}$ titers over four days reveals a wide range of titers produced over four days (B).
Figure 3B:
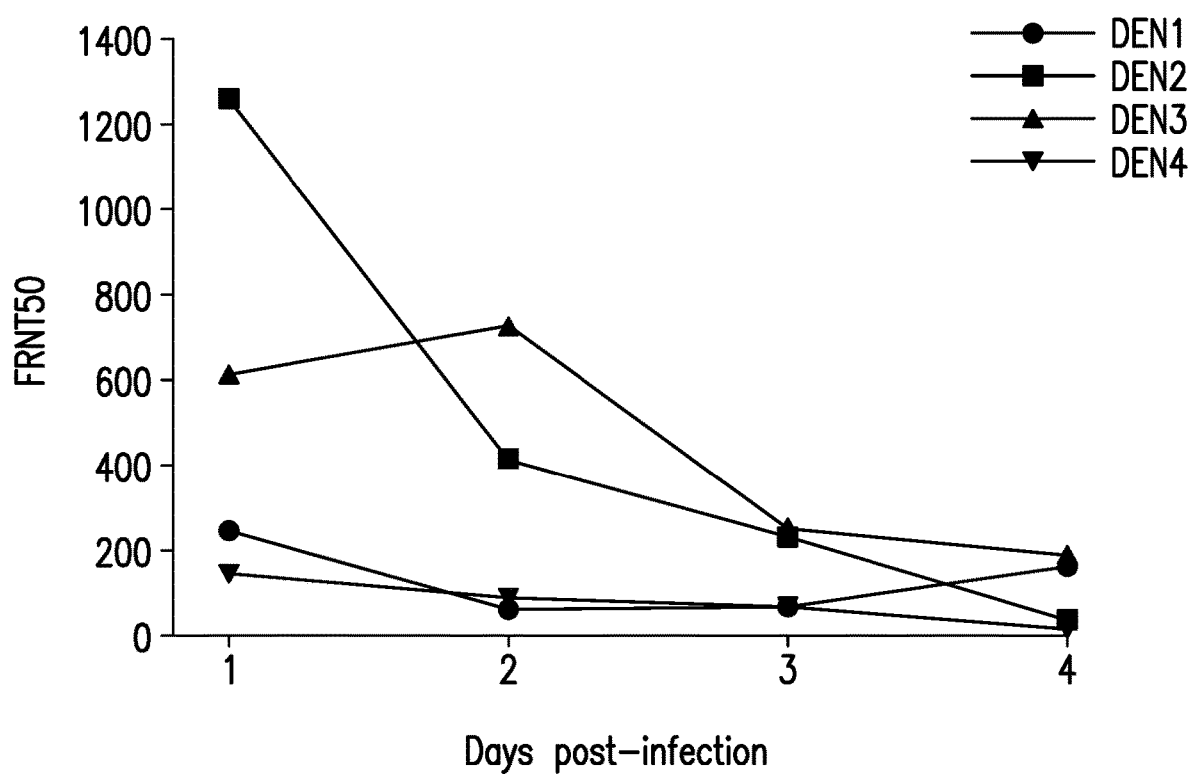

Counting individual virus-infected cells is hypothesized to contribute to the precision of the VRNT. FRNT relies on counting foci manually, which often appear to overlap. Dengue FRNT assays range in infection time (incubation time) and virus input (plaque forming units: PFU) between serotypes and laboratories. Due to these differences, FRNT titers can vary significantly between laboratories. Additionally, highly variable results between labs present challenges to the interpretation of neutralization titers among vaccine trials (Salje, H. et al., *PLoS Negl. Trop. Dis.* (2014) 8:e2952; Rainwater-Lovett, K. et al., *BMC Infect. Dis.* (2012) 12:233). Lab-to-lab and day-to-day variations are well known for the FRNT, however, differences in foci formation could also contribute significantly to the inherent variability. To evaluate the impact of plaque size and potential overlap of foci on titer, $FRNT_{50}$ titers were calculated for DEN1-4 over four consecutive days using 50 PFU of virus. At day one, foci were not observed by eye, however, enlarged images revealed plaques, and by day four, distinct foci were overlapping and difficult to count in many wells for all four viruses (FIG. 3A). Reducing the days of infection reduced the foci size for each virus and smaller foci appeared in close proximity indicating the potential for these smaller foci to fuse together to form larger foci over time (FIG. 3A). The titers between days varied significantly (up to 30-fold) with highest titers when foci were the smallest (FIG. 3B). When compared to VRNT titers for the same serum sample, the day one $FRNT_{50}$ titers were within 1.5-fold of the corresponding $VRNT_{50}$ titers for all four viruses (DEN1-4). This experiment indicates post-day one foci may consist of overlapping smaller foci, which would contribute to the inherent variability as foci formation, due to overlap, could change. Conversely, VRNT only measures individual virus-infected cells and does not have the potential for overlapping or fused foci.

The DOE for DEN1 and DEN2 and subsequent experiments showed that the virus input range can be large (≥16-fold), and the $VRNT_{50}$ titer remains consistent (within 1.5-fold). Thus, VRNT has additional advantages over the FRNT by eliminating the need to alter assay time to control for replication differences between viruses and the requirement to hit a narrow target (virus control foci count).

Figure 4A:
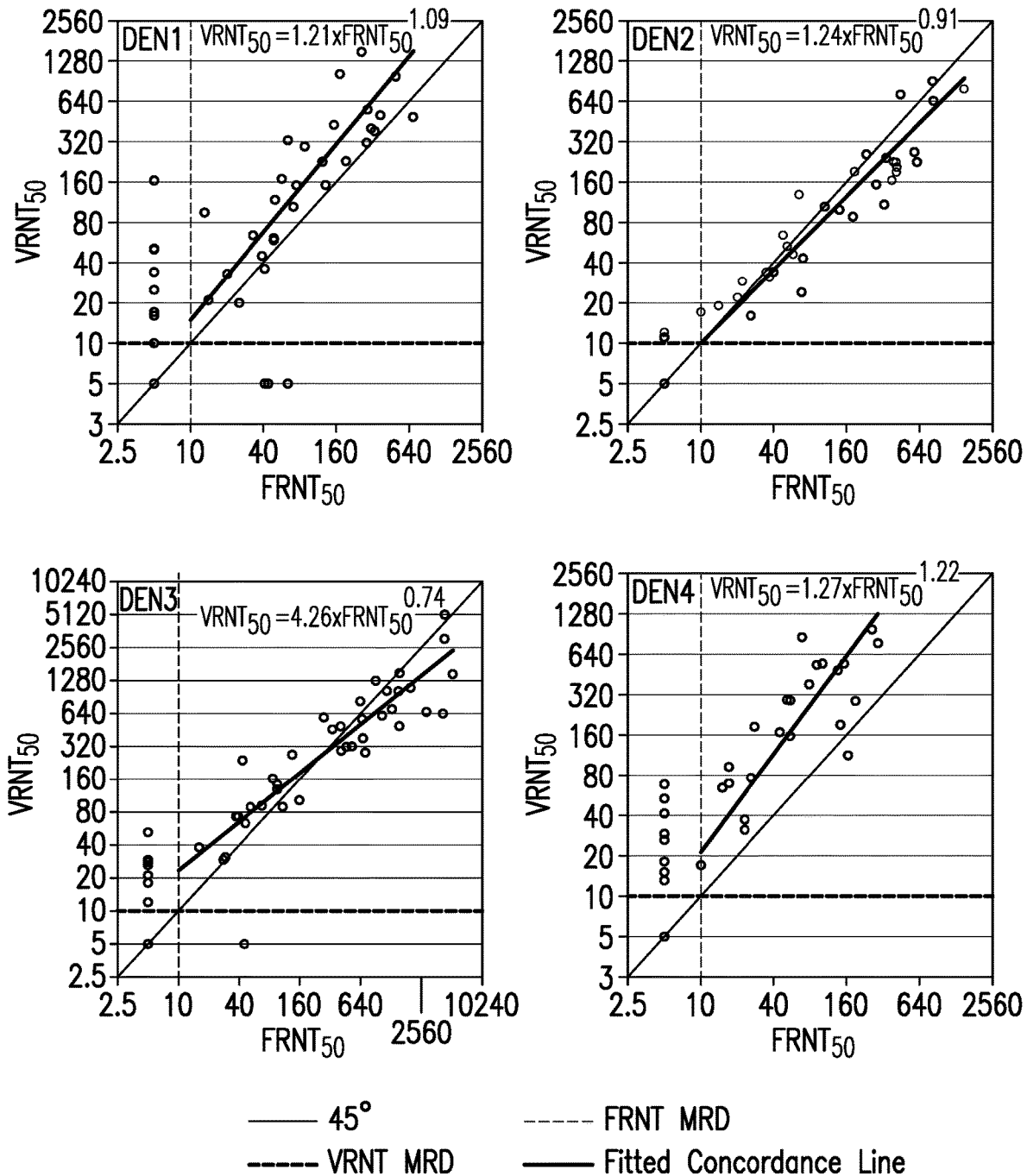
FIG. 4. VRNT/FRNT agreement. $VRNT_{50}$ and $FRNT_{50}$ agreement plot for DEN1-4 (A). Measures of agreement between $VRNT_{50}$ and $FRNT_{50}$ assay procedures (B).

VRNT/FRNT Correlation:

To assess the correlation between the FRNT and VRNT platforms, 81 dengue vaccinated clinical serum samples that were previously tested against all four dengue serotypes in the FRNT were tested against the same four dengue serotypes in the VRNT. The results showed a clear positive association between the two assays for each of the four dengue serotypes (FIG. 4A). Across the four serotypes, the fitted concordance slope ranged between 0.74 and 1.22, and the estimated Pearson correlation coefficient ranged between 0.80 and 0.93. For DEN3, the average fold difference in titer between $VRNT_{50}$ and $FRNT_{50}$ was not statistically significantly different from 1.0. For DEN2, $VRNT_{50}$ titers were on average 1.27-fold lower (95% CI=(1.08, 1.52-fold lower)) than $FRNT_{50}$ titers, while for DEN1 and DEN4, $VRNT_{50}$ titers were on average 1.82-fold higher (95% CI=(1.43, 2.31)) and 3.07-fold higher (95% CI=(2.33,4.05)) respectively compared to $FRNT_{50}$ titers (FIG. 4B). DEN4 virus produced the largest foci in the FRNT and had an 8-fold difference in titer between days 1-4 due to overlapping foci, making the assay more variable and less accurate, a possible reason for the 3-fold difference between $VRNT_{50}$ and $FRNT_{50}$ for this virus.

The VRNT showed greater sensitivity than FRNT, detecting low neutralizing antibody titers in the VRNT compared to no titer in the FRNT. Both platforms (VRNT and FRNT) define a positive sample as $NT_{50} \geq 10$ and negative sample as $NT_{50} < 10$ set by the minimum serum dilution. Across the four serotypes, the VRNT detected titer ($VRNT_{50} \geq 10$, range 10-163) for 29 vaccinated clinical samples that tested negative ($FRNT_{50} < 10$) in the FRNT (5-9 samples per virus). Conversely, the FRNT was positive ($FRNT_{50} \geq 10$, range 41-64) for four vaccinated clinical samples that were negative in the VRNT (DEN1=3, DEN3=1). In addition, of 84 expected negative test results (6 placebo samples and 15 baseline samples tested across the 4 dengue types), 81 (96.4%) tested negative in the VRNT. For each of the three expected negative samples that tested positive in the VRNT, the $VRNT_{50}$ titer was close to the minimum value (10), and the resulting positivity for each sample was attributed to an edge effect. The performance of the VRNT assay on this dataset indicates that the VRNT can distinguish between true positive and true negative clinical samples.

Edge Effect Elimination:

For correlation testing in the VRNT, the number of samples per plate and plates per batch (maximum number of plates per analysts) were increased to mimic a clinical testing environment. This testing revealed a higher than expected retest rate (8-28%) due to replicate ratio failure (>2-fold) among the four dengue viruses, mainly from samples located at the top and bottom of the plate. Following transfer of the assay to $Q^2$ Solutions Vaccines, an even larger replication ratio failure rate was observed again from samples located at the top and bottom of the plate. Subsequent experiments with DRAQ5 indicated that there was a marked difference in the number of cells around the perimeter of the plate versus the plate interior (FIG. 5). It was determined that this phenomenon was also evident before the start of the assay and occurred at the cell seeding step. It was hypothesized that cell attachment was inhibited in the perimeter of the plate due to the rapid heating at 37° C. of the wells exposed to the exterior versus a potential insulation effect of the interior wells. To overcome this effect, cells were seeded and plates were held at room temperature before placing in the 37° C. incubator overnight. The result was an elimination of the edge effect with as little as 15 minutes at room temperature before placing the plates in the 37° C. incubator. To confirm the loss of edge effect and improved consistency of replicate titers, each of three plates were seeded with 30,000 cells, with one plate kept at room temperature for either 15, 30 or 45 minutes before being placed at 37° C. overnight. These times were chosen as 30 minutes was considered an optimal time for analysts and 15/45 minutes gated around this preferred time (FIG. 6A-B). The same test sample was evaluated across the three plates. In each case, the sample passed with replicate ratios close to 1.0, indicating that the elimination of the edge effect improved the consistency of the replicate titers. The % CV in this experiment ranged from 7-25%, and 30,000 cells per well (kept at room temperature for 30 minutes) and was selected as the optimal condition (FIG. 6C).

The VRNT counts individual infected cells rather than large overlapping foci (FRNT), and unlike traditional microneutralization assays which rely on a whole well intensity or reporter viruses (Shan, C. et al., *E. Bio. Medicine* (2017) 17:157-162; Song, K. Y., et al., *BMC Microbiol.* (2014) 14:44; Yang, H. et al., *J. Biopharm, Stat.* (2016) 26:409-420; Maistriau, M. et al., *Virus Res.* (2017) 237:1-6; Lin R. et al., *J. Virol. Methods* (2017) 247:15-21), the VRNT is rapid (counting virus-infected cells one day post-infection) and uses unaltered wild-type virus. Compared to other microneutralization assays, including the FRNT adapted to the 96-well format which counts spots >2 days, the VRNT offers additional advantages in the ability to count one infected cell within one day, rather than waiting for overlapping foci to form, which ensures accuracy and contributes to the increased precision and sensitivity of the VRNT. The VRNT considerably reduces labor and analysis time, eliminates manual plaque counting and significantly increases throughput. This novel neutralization platform correlates well with FRNT and is an alternative to the gold-standard FRNT for dengue virus vaccine candidates. Though not presented here, experiments with viruses from unrelated families show the VRNT is a universal platform and can be widely utilized.

Other Viruses Tested Utilizing the Neutralization Assay of the Instant Invention:

The requirements for the VRNT are such that any virus can be used in the platform as long as it 1) infects adherent cells and 2) has an available antibody against the viral protein. The VRNT has been used for other viruses, including Respiratory Syncitial Virus (strains A and B), Ebola Zaire-GP and Marburg-GP viruses. For these viruses, the platform method is similar to the process stated above in that 1) adherent cells are used and the infection step occurs within 24 hours, and 2) imaging cytometry is utilized for analysis.

What is claimed is:

1. A dengue virus (DENV) neutralization assay to determine the amount of DENV neutralizing antibody in a sample, the assay comprising:
   A) an incubation step: wherein a mixture comprising i) DENV and ii) a sample is incubated; wherein sample antibody, if present in the sample, binds to the DENV rendering the bound DENV neutralized;
   B) a plating step: wherein predetermined amounts of the mixture from step A are added to seeded Vero cells in individual wells of 96-well plates; wherein unbound DENV is free to infect the Vero cells, wherein beforehand the cells were seeded, and plates held at room temperature for at least 15 minutes before placing the plates in a 37° C. incubator, wherein the Vero cells are adherent cell lines;
   C) an infection step: wherein the Vero cells, after the step B addition of the predetermined amounts of the mixture, are incubated for an amount of time (the infection incubation time) to allow DENV infection; wherein the infection incubation time lasts no longer than about 24 hours,
   wherein the DENV-infected Vero cells do not overlap or fuse together during the infection incubation time due to the infection incubation time not lasting longer than about 24 hours;
   D) a fixing step;
   E) a detection step; and
   F) an imaging step: wherein the DENV-infected Vero cells are individually counted through single cell imaging utilizing imaging cytometry and software, to determine the amount of DENV neutralizing antibody in the sample.

2. The method of claim 1 wherein the DENV is dengue virus serotype 1 (DENV1).

3. The method of claim 1 wherein the DENV is dengue virus serotype 2 (DENV2).

4. The method of claim 1 wherein the DENV is dengue virus serotype 3 (DENV3).

5. The method of claim 1 wherein the DENV is dengue virus serotype 4 (DENV4).

6. The method of claim 1 wherein step D comprises a fixative which is selected from the group consisting of methanol, acetone, ethanol, formalin and a mixture of paraformaldehyde and octylphenoxy polyethoxy ethanol, or a combination thereof.

7. The method of claim 6 wherein the fixative is a 1:1 mixture of methanol/acetone.

8. The method of claim 1 wherein the sample is a dengue vaccinated clinical serum sample.

* * * * *